June 14, 1949. W. F. DOUBLE ET AL 2,472,813
TANDEM AXLE CONSTRUCTION
Filed Feb. 6, 1947 3 Sheets-Sheet 1
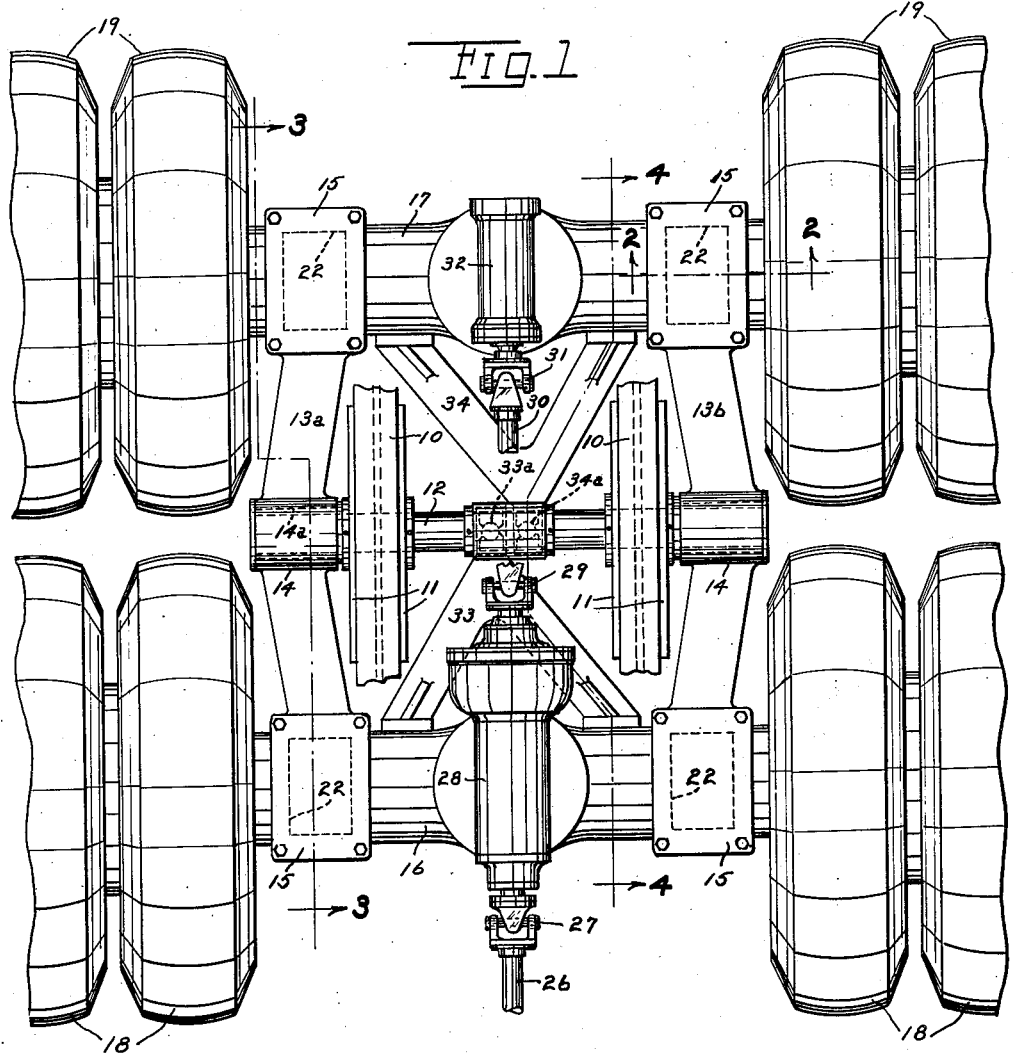
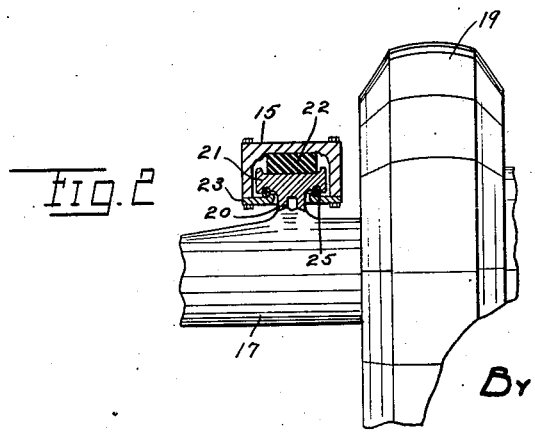
INVENTORS
WALTER F. DOUBLE
STEWART F. ARMINGTON
RAYMOND Q ARMINGTON
By Hyde, Meyer, Baldwin & Doran
ATTORNEYS June 14, 1949.  W. F. DOUBLE ET AL  2,472,813
TANDEM AXLE CONSTRUCTION Filed Feb. 6, 1947  3 Sheets-Sheet 2

INVENTORS
WALTER F. DOUBLE
STEWART F. ARMINGTON
RAYMOND Q. ARMINGTON
By Hyde, Meyer, Baldwin & Doran
ATTORNEYS June 14, 1949.  W. F. DOUBLE ET AL  2,472,813
TANDEM AXLE CONSTRUCTION Filed Feb. 6, 1947  3 Sheets-Sheet 3

INVENTORS
WALTER F. DOUBLE
STEWART F. ARMINGTON
RAYMOND Q. ARMINGTON
By Hyde, Meyer, Baldwin & Doran
ATTORNEYS Patented June 14, 1949

2,472,813

UNITED STATES PATENT OFFICE 2,472,813

TANDEM AXLE CONSTRUCTION

Walter F. Double, Wickliffe, Stewart F. Armington, Willoughby, and Raymond Q. Armington, Shaker Heights, Ohio, assignors to The Euclid Road Machinery Co., Cleveland, Ohio, a corporation of Ohio Application February 6, 1947, Serial No. 726,871

3 Claims. (Cl. 280—104.5)

This invention relates to improvements in tandem axle construction and more particularly for improved means for supporting a vehicle upon tandem axles in a manner to permit the necessary relative motion between the axles and the vehicle.

One of the objects of the present invention is to provide novel support means between tandem axles and a vehicle utilizing a resilient body such as rubber, for permitting relative motion between the axle and the vehicle body. The present invention utilizes the resilient body to support substantially vertical loads only.

Other objects and advantages of the present invention will be apparent from the accompanying drawings and specification and the essential features thereof will be set forth in the appended claims.

In the drawings,

Fig. 1 is a plan view of one embodiment of our invention with the major portion of the vehicle removed so as to more clearly show the axle construction;

Fig. 2 is a fragmentary sectional view taken along the line 2—2 of Fig. 1;

Figure 3:
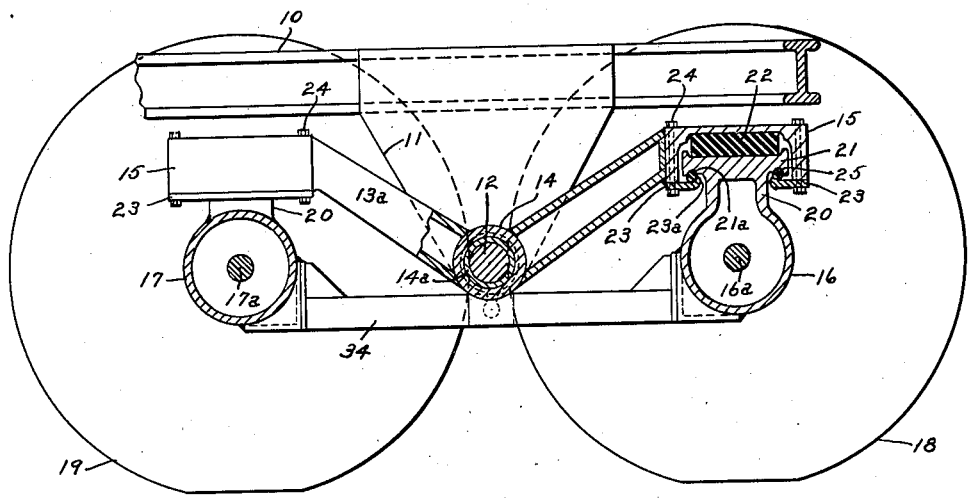
Figure 4:
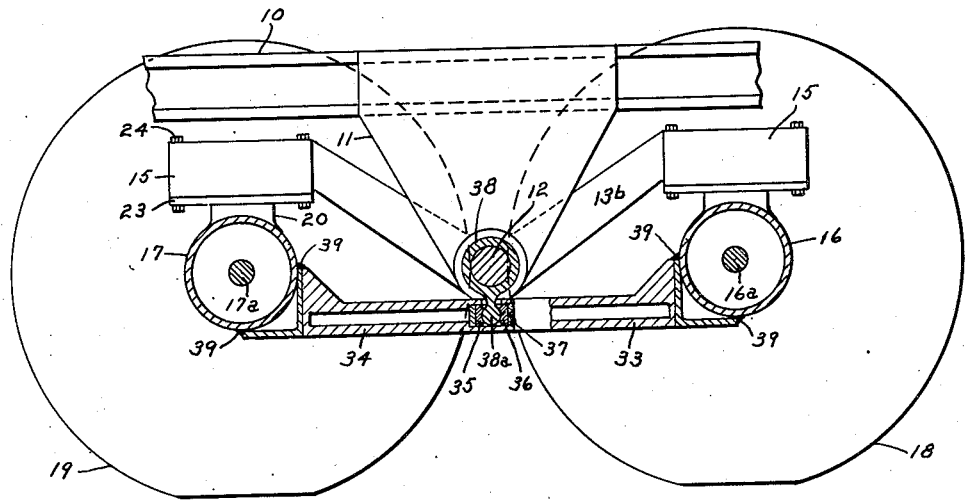
Figure 5:
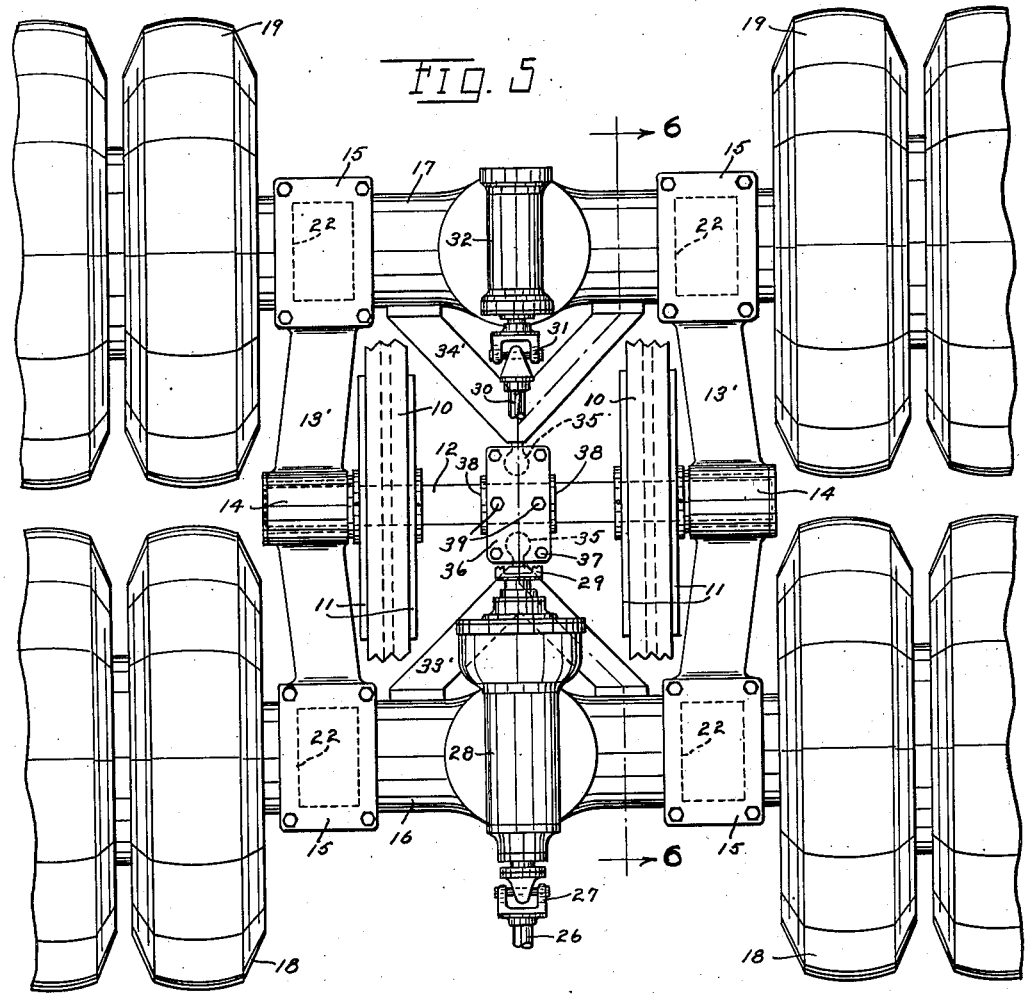
Figure 6:
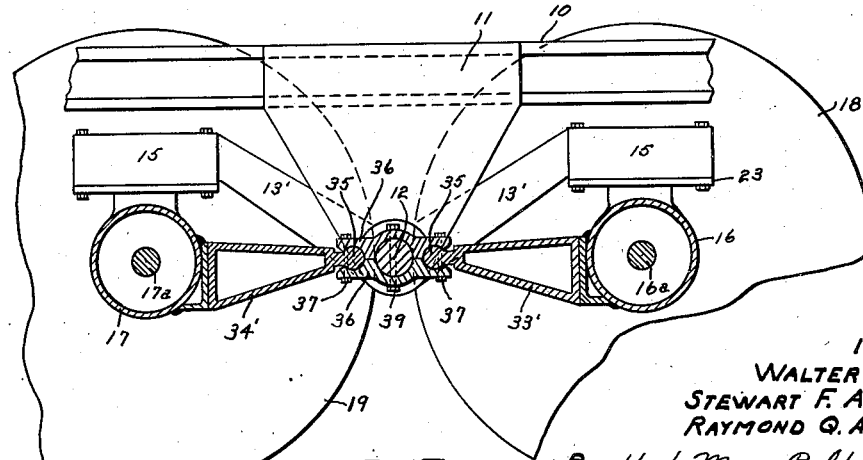

Figs. 3 and 4 are sectional views taken along similarly numbered lines of Fig. 1; while Figs. 5 and 6 show a modified form of our invention wherein Fig. 5 is a plan view thereof similar to Fig. 1, and Fig. 6 is a sectional view taken along the line 6—6 of Fig. 5.

The present invention is related to supporting wheel means for heavy vehicles requiring a plurality of axles and wheels for supporting heavy loads. Various constructions have been utilized to provide tandem axles for supporting a vehicle and to provide means permitting relative movement between the axles and the vehicle. The present invention utilizes resilient bodies such as rubber for permitting this relative movement.

In the form of our invention shown in Figs. 1 to 4 inclusive, a portion of the vehicle frame is indicated by the parallel I-beams 10. A further showing of the vehicle body is deemed unnecessary. Extending downwardly from each beam 10 is a pair of bracket plates 11 which support a pivot shaft 12 in fixed relationship to the vehicle frame. Oscillatably mounted on opposite ends of the pivot shaft are rocker beams 13a and 13b. Each beam has a central hub 14 provided with a suitable bearing 14a between the hub and shaft 12. Opposite arms of each rocker beam diverge upwardly from the hub 14 and each arm terminates in a generally rectangular cap 15. Forward and rearward axle housings 16 and 17 support forward drive wheels 18 and rearward drive wheels 19 respectively. The forward and rearward axle housings enclose drive axles 16a and 17a respectively, which are driven in a manner presently described, so as to rotate the wheels 18 and 19.

The resilient bodies of rubber or the like, are interposed between the caps 15 of the rocker beams and the axle housings 16 and 17, as best shown in Figs. 2 and 3. Integral with the axle housings are upwardly extending stems 20 terminating in an enlarged head 21, there being two of these on each axle housing, or four in all. Each of these heads 21 has a cup shape upper surface upon which rests a body of resilient material such as rubber or the like and indicated at 22. Each of the caps 15 is open at the bottom and after the parts are assembled, a closing plate 23, made in two parts, is secured by bolts 24 so as to hold the parts assembled as shown in Figs. 2 and 3. A retaining ring 25 of rubber or the like is held between an annular flange 23a of the retaining plate and an annular groove 21a in the head 21. It will be noted that the resilient bodies 22 are here shown as rectangular in shape and we find that rubber approximately three inches thick and 8 x 12 inches in width and length gives a suitable support for heavy duty trucks. It will be noted that each body of rubber 22 is held about the periphery against escape or spreading while at the same time permitting relative vertical movement between the head 21 and the cap 15.

Any suitable means may be utilized for rotating the drive shafts 16a and 17a to turn the drive wheels. We have chosen to show a construction wherein the propeller shaft 26 is connected by a universal joint 27 with worm drive mechanism within the housing 28 which is properly connected through differential mechanism with drive shaft 16a. The drive continues through the housing 28, universal joint 29, shaft 30 and universal joint 31 to a suitable worm drive in the housing 32. Suitable drive connections are provided from this point to the driving axle 17a. This drive permits suitable power transmission to both forward and rear wheels regardless of the position of the tandem axles when moving over rough ground.

Means is provided to take care of brake and driving torque and to provide proper sidewise location of the axles relative to the frame 10 and independent of the rubber bodies 22. This comprises wishbones 33 and 34. Each wishbone has a ball and socket connection 33a and 34a respectively with the pivot shaft 12. As best seen in Fig. 4, the wishbone 34 has a pair of arcuate plugs 35 and 36 removably held in position by the threaded plug 37 embracing a ball shape head 38a which is rigidly connected with a sleeve 38 which in turn has a force fit over the shaft 12. The mounting of the apex end of wishbone 33 is similar to that just described. The diverging ends of each wishbone are secured to their associated axle housings, wishbone 33 to housing 16 and wishbone 34 to housing 17 as by welding applied at the points 39.

It results from the above construction that as the vehicle is driven over rough ground, if all of the wheels 19 are raised or lowered substantially equally relative to the wheels 18 the movement is taken care of by oscillation of the rocker beams 13a and 13b about the pivot shaft 12. If, however, unequal movement occurs between the wheels on opposite sides of the vehicle there is a tilting movement of the axle housings 16 or 17 about the longitudinal center line of the vehicle. Distortion of the resilient bodies 22 is adapted to accommodate all such tilting action without strain on the other parts of the construction. For instance, if the wheel 19 of Figs. 1 and 2 is raised relative to the opposite left-hand wheel the axle housing 17 will tend to be inclined upwardly toward the right while the cap 15 associated with the rocker arm 13b will tend to remain level along with the vehicle body. This causes the block 22 to be distorted so that the right-hand side thereof as viewed in Fig. 2 will become narrower and the head 21 will be nearer the cap 15 on the right-hand side and farther from the cap on the left-hand side as viewed in Fig. 2. This action will be clearly understood by those skilled in this art.

During all such relative movement between the axle housings and the vehicle body, while traveling over rough ground, the brake and driving torque, as well as the tendency toward side movement, will be accommodated by the wishbones 33 and 34 which are fixed relative to their ball and socket joints 33a and 34a respectively, while permitting oscillation in any direction of each wishbone about its ball and socket connection.

The modification shown in Figs. 5 and 6 is similar to that already described except for the following differences. The axle housings 16 and 17 together with their associated wheels 18 and 19 are exactly like those already described. The pivot shaft 12 and its support from the frame 10 is exactly the same. The wishbones 33' and 34' have ball and socket connections located opposite each other along the center line of the vehicle. Each wishbone has a ball shape head 35 which is received in a suitable socket in a split bracket 36 having upper and lower halves secured together by the bolts 37. The bracket 36 is firmly held on the shaft 12 by collars 38 and bolts 39. The driving means in this modification is like that already described.

The operation of the construction shown in Figs. 5 and 6 is quite similar to that first described. Resilient blocks or pads 22 exactly like those previously described are held by the caps 15 mounted on the rocker beams 13'. These pads take the vertical loads and are distorted to take care of the tilting of the axle housings relative to the vehicle as in the first described form, while the wishbones 33' and 34' absorb the brake and driving torque and take care of sidewise location.

What we claim is:

1. Tandem axle construction comprising a vehicle frame, a shaft rigidly supported thereon and therebeneath and extending transversely of said frame, parallel rocker beams on opposite sides of said frame, each beam having an intermediate portion oscillatably mounted on said shaft and having arms diverging upwardly from said shaft in a fore-and-aft direction, parallel front and rear axle units on opposite sides of said shaft, each of said axle units having wheel means at opposite sides of said vehicle, interengaging pairs of connecting parts between each of said axle units and the free ends of said rocker beam arms, a resilient deformable body between each said pair of connecting parts for cushioning relative movement between said axle units and said beams, and a V-shape wishbone bracket for each axle unit, each of said brackets having a universal connection between the apex of said V-shape and said shaft and having the diverging legs of said V-shape secured to the associated axle unit.

2. Tandem axle construction comprising a vehicle frame, a shaft rigidly supported thereon and therebeneath and extending transversely of said frame, parallel rocker beams on opposite sides of said frame, each beam having an intermediate portion oscillatably mounted on said shaft and having arms extending therefrom in fore-and-aft directions, parallel front and rear axle units on opposite sides of said shaft, each of said axle units having wheel means at opposite sides of said vehicle, connecting means between each of said axle units and the adjacent free ends of said rocker beam arms, a resilient deformable body in each of said connecting means for cushioning relative movement between said axle units and said beams, and a V-shape wishbone bracket for each axle unit, each of said brackets having a universal connection between the apex of said V-shape and said shaft and having the diverging legs of said V-shape rigidly secured to the associated axle unit.

3. Tandem axle construction comprising a vehicle frame, parallel rocker beams pivotally mounted intermediate their ends on said frame for oscillation in planes extending in fore-and-aft direction, said pivotal mountings being alined transversely of said frame, parallel front and rear axle units each having wheel means at opposite sides of said vehicle, connecting means between each of said axle units and the free ends of said rocker beams, a resilient deformable body in each said connecting means for cushioning relative movement between said axle units and said beams, means for resisting braking and driving torque and for controlling relative lateral movement between said axle units and said frame comprising torque arms, one for each of said axle units, each torque arm having a rigid connection with its associated axle unit and having a universal connection with said frame, and said universal connections being substantially at the level of said rocker beam pivotal mountings.

WALTER F. DOUBLE.
STEWART F. ARMINGTON.
RAYMOND Q. ARMINGTON.

REFERENCES CITED

The following references are of record in the file of this patent:

UNITED STATES PATENTS

| Number | Name | Date |
|---|---|---|
| 2,193,567 | Pointer | Mar. 12, 1940 |
| 2,339,539 | Zeilman | Jan. 18, 1944 |